April 17, 1962 K. VEIT 3,029,687
MOTION PICTURE APPARATUS
Filed Oct. 20, 1959 3 Sheets-Sheet 1

INVENTOR
Karl Veit
by Michael S. Striker
Attorney

April 17, 1962 K. VEIT 3,029,687
MOTION PICTURE APPARATUS
Filed Oct. 20, 1959 3 Sheets-Sheet 2

INVENTOR
Karl Veit
by:
Michael S. Striker
Attorney

April 17, 1962 K. VEIT 3,029,687
MOTION PICTURE APPARATUS
Filed Oct. 20, 1959 3 Sheets-Sheet 3

INVENTOR
Karl Veit
by: Michael S. Strike
Attorney

United States Patent Office

3,029,687
Patented Apr. 17, 1962

3,029,687
MOTION PICTURE APPARATUS
Karl Veit, Esslingen (Neckar), Germany, assignor to
Robert Bosch G.m.b.H., Stuttgart, Germany
Filed Oct. 20, 1959, Ser. No. 847,618
Claims priority, application Germany Oct. 21, 1958
2 Claims. (Cl. 88—17)

The present invention relates to motion picture apparatus such as motion picture cameras and projectors.

More particularly, the present invention relates to structure along which film slides. For example, it is conventional in a motion picture projector to provide steel bands which press the film against a guide surface, and these bands are of disadvantage for a number of reasons. Thus, because the film usually engages the steel bands with the emulsion side of the film, after awhile the emulsion rubs off and an undesirable deposit accumulates on the steel bands preventing them from operating properly and necessitating cleaning of the apparatus. Furthermore, such steel bands because of their inherent elasticity have a tendency to move away from a curved surface against which they press the film during movement of the latter, and it does not infrequently happen that a part of the steel band does not press the film against the guide surface so that the best possible operation is not provided.

One of the objects of the present invention is to provide a band means which will hold the film against a guide surface of the motion picture apparatus and which at the same time has an extremely low coefficient of friction with respect to the film so that the latter slides easily with respect to the band means and thus eliminates the possibility of undesirable deposits accumulating on the band.

A further object of the present invention is to provide a band means of the above type which is of very low inherent elasticity so that due to its lack of elasticity and its great flexibility it conforms perfectly to the curved surface along which the film moves and against which the band presses the film so that there is no possibility of any part of the band means rising, due to resiliency of the band means itself, away from the film guiding surface.

An additional object of the present invention is to provide a structure which will evenly tension a pair of plastic bands which respectively engage the opposite side edge portions of a film for pressing the latter against a guide surface.

It is also an object of the present invention to provide a structure capable of adjusting the tension applied to the plastic bands.

With the above objects in view the present invention includes in a motion picture projector an arcuate surface along which the film is guided and a plastic band means for engaging the film and pressing the same against the guide surface, this plastic band means being made of a material having a low coefficient of friction with respect to the film so that the latter slides easily with respect to the plastic band means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
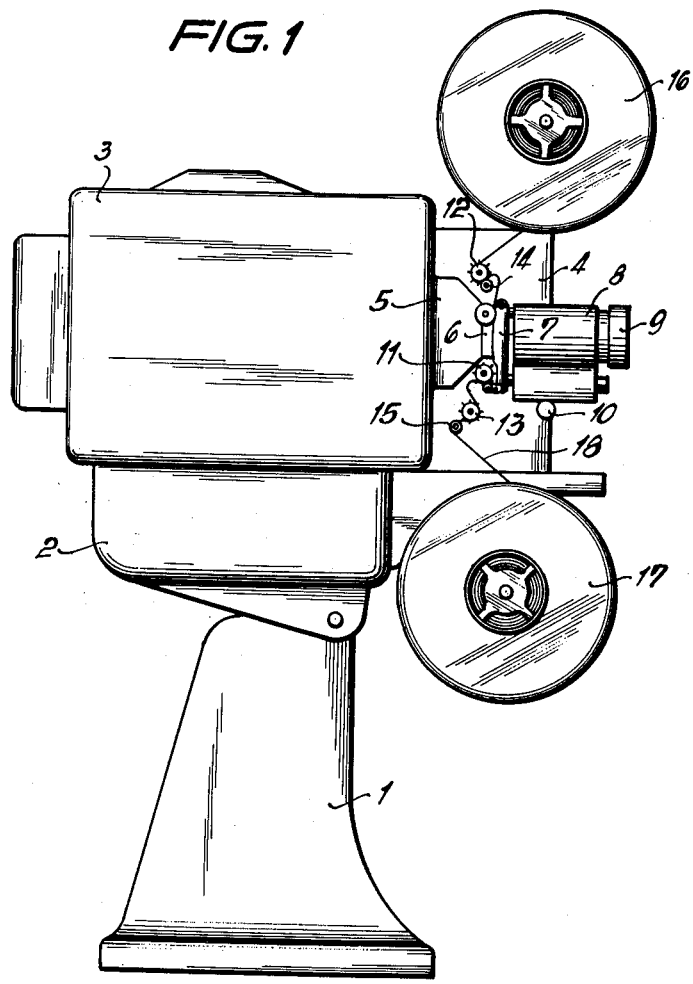
FIG. 1 is a schematic side elevation of a motion picture projector having the structure of the invention.

Referring to FIG. 1, the motion picture projector illustrated therein includes a base 1 on which a support 2 is mounted for tilting movement, as is well known. The support 2 carries a lamp 3 and a mechanism 4. This mechanism 4 includes the structure for transporting and advancing the film. The side of the projector where the operator is located is visible in FIG. 1, and at this side of the projector there is shown in FIG. 1 the shutter housing 5, which at its front end carries an apertured plate assembly 6, and FIG. 1 also shows a film gate 7 and an objective carrier 8. The objective 9 is carried by the objective carrier 8, and the assembly made up of the objective 9, the objective carrier 8 and the film gate 7 can be moved away from the apertured plate assembly 6 by actuation of a hand grip 10 which in a known way serves to releasably lock the assembly 7—9 in its operating position. The hand grip 10 is actuated by the operator in order to release the assembly 7—9 for cleaning purposes as well as for threading the film through the projector.

At the operator's side of the projector visible in FIG. 1 there are also located the film transporting roll 11 which serves to pull the film through the path extending between the assemblies 6 and 7 in a stepwise fashion, the film feeding roll 12 and the film advancing roll 13, and also the film guiding rolls 14 and 15. A supply reel 16 is carried by the housing of the mechanism 4, while a film take-up reel 17 is carried by the tiltable support 2. The film 18 moves from the supply reel 16 over the several rolls referred to above to the take-up reel 17.

Figure 2:
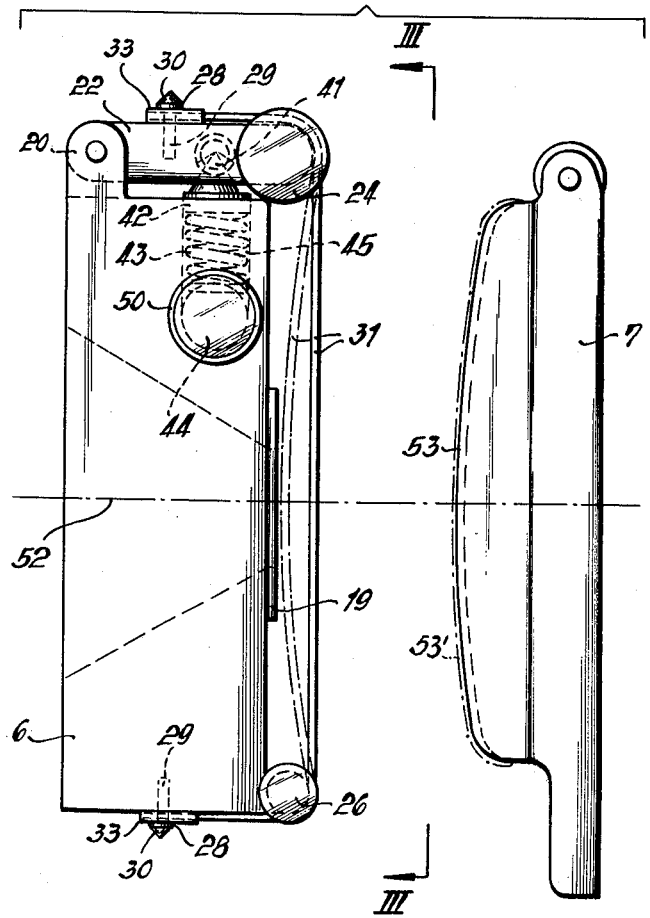
FIG. 2 is a side view on an enlarged scale of that part of the structure of FIG. 1 to which the structure of the invention is applied.
Figure 3:
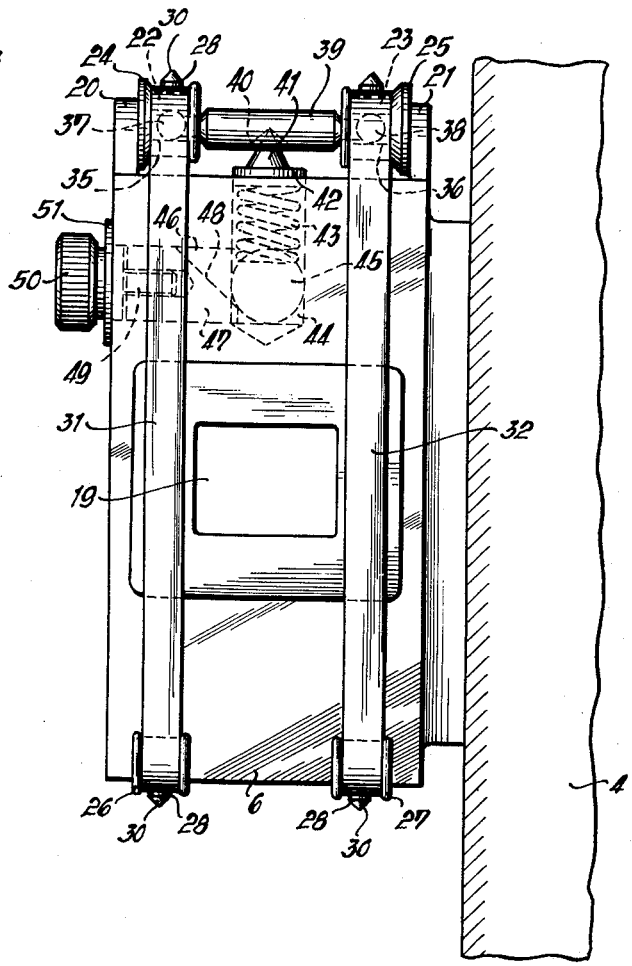
FIG. 3 is a front view of the left unit of FIG. 2 as seen in the plane III—III of FIG. 2 when looking toward the left, as shown by the arrows in FIG. 2.

Referring to FIGS. 2 and 3, it will be seen that the apertured plate assembly 6 is in the form of a support having at its front end a wall which carries the window frame 19 which defines the rectangular aperture visible in FIG. 3 through which the light moves from the lamp to the film. The support 6 is provided with a pair of opposed faces to which a plastic band means described below is connected. At the upper one of these opposed faces, as viewed in FIGS. 2 and 3, the support 6 is provided with a pair of eyes 20 and 21 to which a pair of levers 22 and 23 are respectively pivotally connected, these levers extending along the upper face of the support 6 and being turnable toward and away from this upper face, as viewed in FIGS. 2 and 3. At their free ends which are respectively distant from the eyes 20 and 21, the levers 22 and 23 respectively carry a pair of guide discs 24 and 25 which are fixed to the levers 22 and 23.

At the lower face of the support 6 the latter is provided with a pair of cylindrical guide elements 26 and 27 respectively aligned vertically beneath the guide elements 24 and 25, as is apparent from FIGS. 2 and 3. The guide members 26 and 27, which are of generally cylindrical configuration, are provided at their opposite ends with a pair of annular projecting rings. It will be noted that the elements 24 and 25 are similarly constructed.

The pair of levers 22 and 23 fixedly carry a pair of studs 28 provided with head ends 30, and a pair of identical studs are carried by the support 6 at the lower face of the latter, these studs respectively having shanks 29 fixed to the levers 22 and 23 as well as to the bottom end of the support 6. The head ends 30 of the several studs 28 are of conical configuration and have their portions of largest diameter located next to the shank 29 and of substantially greater diameter than the latter.

Figure 4:
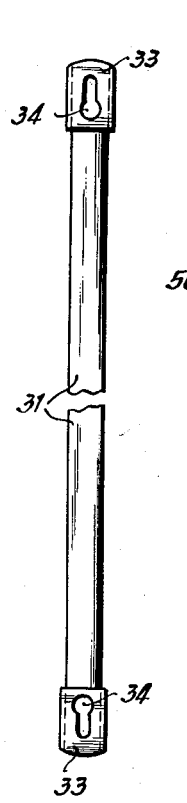
FIG. 4 is an illustration of an elongated plastic band assembly according to the invention.

An end of a plastic band according to the invention is adapted to be connected to each stud 28. In the example illustrated in the drawings, the plastic band means of the invention is made upon a pair of bands 31 and 32, and the ends of this pair of bands are respectively connected to the studs 28. For this purpose, as shown in FIG. 4, each of the bands 31 and 32 fixedly carry at its ends, respectively, a pair of metal clips 33 each of which is in the form of a metal plate formed with a keyhole slot 34. The wider portion of the slot 34 is large enough to allow the head 30 to pass therethrough while the narrow portion of each slot 34 has a smaller width than the diameter of the head 30 so that in this way after the clips 30 are placed over the pegs or studs 28 the narrow ends of the keyhole slots engage the shanks 29 and serve to retain the plastic bands in their operating positions. The metal clips 33 are fixed in any suitable way to the bands 31 and 32 as, for example, by having the side edge portions of the clips 33 curved around the side edges of the band and pressed against the latter so that the side edges of the band are tightly gripped by the side edges of the clips. As is apparent from FIGS. 2 and 3, the pair of bands 31 and 32 extend from the lower studs 28 respectively around the guides 26 and 27 along the front end of the apertured plate assembly 6, without engaging this front end, up to the guides 24 and 25 and around the latter to the upper pair of studs 28 which are respectively carried by the levers 22 and 23, and these levers can be moved downwardly toward the upper face of the support 6 so as to locate the upper studs 28 nearer to the lower studs 28 so as to make it easier to connect the bands 31 and 32 with the assembly.

As is shown most clearly in FIG. 3, the levers 22 and 23 are respectively formed with bores 35 and 36 extending transversely therethrough, and the spherical ends 37 and 38 of a transverse balancing member 38 are respectively located in the bores 35 and 36. This transverse member 39 is formed with a downwardly directed recess 40 of substantially conical configuration, and the pointed end portion 41 of a pin 42 extends into the recess 40. The pin 42 is slidably guided for vertical movement in a bore 45 formed in the apertured plate assembly 6, and a compression spring 43 bears at its top end against the pin 42 and at its bottom end against a ball member 44 made of a rigid metal such as steel, for example. The parts 42—44 form a spring means which act on the transverse member 39 and through the latter on the levers 22 and 23 to urge the latter upwardly away from the top face of the apertured plate 6 so as to tension the bands 31 and 32, the transverse member 39 guaranteeing that the force of the spring 43 is distributed evenly between the levers and thus between the bands 31 and 32.

An adjusting means is provided for adjusting the compression of the spring 43 of the above spring means, and this adjusting means includes a horizontal bore 46 formed in the plate 6 and communicating with the bore 45, as shown in FIG. 3. The bore 46 slidably receives in its interior a slide block 47 having an inclined surface 48 engaging the ball member 44 at its underside. The slide block 47 is formed with a threaded bore which threadedly receives the screw member 49 which is connected to the plate assembly 6 for turning movement but not for axial movement. Thus, a split ring 51 or the like which extends into an annular groove of the screw member 49 is fixed to the support 6 so that the screw 49 can rotate around its axis but cannot shift along its axis, and the screw 49 carries at its exterior left end, as viewed in FIG. 3, a knurled knob 50 so that the operator can conveniently turn the screw 49 to advance the slide block 47 in either direction along the axis of the screw 49 and thus control the elevation of the ball member 44 so as to control the extent to which the spring 43 is compressed, and in this way the tension on the bands 31 and 32 is regulated.

As is shown in FIG. 2, opposite the apertured plate assembly 6 along the optical axis 52 is located the film gate assembly 7, this film gate assembly being provided with the arcuate film guiding surface 53. The parts are shown in FIG. 2, with the film gate assembly 7 advanced away from the apertured plate assembly 6. In the position of the parts shown in FIG. 2 not only can the film be threaded through the projector, but in addition the plastic bands 31 and 32 of the invention can also be mounted in position. This mounting of the bands can be very quickly carried out as a result of the above-described keyhole slots of the clips 33 which cooperate with the several studs 28.

The length of each band 31 and 32 is so chosen that even in the illustrated end position of the slide block 47 these bands are under a certain tension which nevertheless does not render the fastening of the bands to the studs 28 particularly inconvenient. The ball member 44 is shown in FIG. 3 at the lowest possible position of the ball member and at this position the spring 43 is compressed to some extent but not to such a great extent that the joining of the bands to the assembly becomes difficult. With the bands 31 and 32 thus assembled, the operator turns the knob 50 so as to shift the slide block 47 to the right, as viewed in FIG. 3, and thus raise the ball member 44 to compress the spring 43 to an increasing degree, and this is done until the bands are tensioned to the desired degree. The force of the spring 43 is distributed equally to the pair of bands and maintains them equally tensioned during operation of the projector, as a result of the balancing member 39 which can not only tilt in all directions with respect to the pointed end 41 of the member 42 but which can also turn at its spherical ends 37 and 38 with respect to the levers 22 and 23. Thus, before the assembly 7—9 is returned to its operating position the vertical sections of the bands 31 and 32 extend along straight paths, as shown in solid lines in FIG. 2. When the assembly 7—9 is returned to its operating position, the film gate 7 is placed so close to the apertured plate 6 that the bands 31 and 32 closely conform to the curvature of the arcuate guide surface 53 and assume the curved configuration shown in dot-dash lines in FIG. 2. The bands 31 and 32 are of very low elasticity and are highly flexible so that they conform without resistance to the curvature of the surface 53 and along the entire length of the latter so that the film located between the band means 31, 32 and the guide surface 53 is accurately pressed against the latter along the entire area thereof without leaving the guide surface 53 at any point. Thus, the structure of the invention will reliably hold the film accurately at the proper distance from the objective and thus the region of the film located at the elevation of the aperture 19 will reliably provide a sharp image on the projection screen. Moreover, since the film is held reliably against the entire area of the guide surface 53 without any part of the film lifting away from this surface, the film will accurately conform to the stepwise feeding provided by the roll 11 and the successive film frames will be accurately aligned with the window 19. Thus, the bands 31 and 32 together with the structure which carries and tensions the same guarantee very efficient operation of the projector.

In accordance with the invention, the plastic band means of the invention is made of a flexible, substantially non-elastic resin which has an extremely low coefficient of friction with respect to the film. When using a tetrafluoroethylene resin, for example, which is to say a polymerizate thereof, which is obtained by reacting chloroform with hydrogen fluoride to form difluoromonochloromethane and heating the same, the coefficient of friction is in the region of 0.1–0.3. Thus, the material of the plastic bands of the invention is preferably polytetrafluoroethylene, a polymerized tetrafluoroethylene, such as Teflon. This material has a strong resistance to chemical action as well as to moisture and has an extraordinarily low coefficient of friction as pointed out above. As a result of the "self-lubricating" property of this material the film which slides therealong cannot form any deposits thereon, and the film will shift and slide with respect to the bands in a perfect manner at all times. This is true even when a new fresh film is used with the emulsion side of the film engaging the bands, as is the case when the film is properly threaded on the projector.

Thus, the film is normally guided so that its emulsion side is directed towards the window 19, and it is therefore of primary importance to make the plastic band means 31, 32 of a material such as that referred to above. However, it may also be desirable to provide the guide surface 53 as well as all other surfaces along which the film slides with a layer 53' of a plastic material such as polytetrafluoroethylene. This material is more durable than coatings conventionally used for this purpose and in addition no deposit can form on this material.

When the bands 31, 32 become worn, they can quickly be exchanged for a new pair of bands. Inasmuch as the bands are relatively inexpensive the important factor to consider is not so much resistance to wear as low friction, and of course, the fact that there is extremely low friction enhances the wearability of the bands. It should be noted that when steel bands are used, even though such bands may wear over a considerably long period of time, and even though these bands of steel are highly polished, nevertheless the emulsion does accumulate thereon and causes inaccurate guiding of the film with inaccurate image projection.

Instead of connecting the ends of the bands 31, 32 to tensioning levers 22 and 23 which are vertically movable, the ends of the bands can be connected to tensioning members which are guided only for horizontal movement, and in this case instead of rounded ends 24 and 25 of the levers 22 and 23 as well as the rounded guide members 26 and 27, the structure can be provided with turnable guide rollers so that in this case also each of the tensioning bands is uniformly tensioned along its entire length.

In the event that the bands 31 and 32 stretch nonelastically, especially after operating over a considerable period of time, the compression spring 43 will nevertheless maintain a tension in the bands sufficient to provide the desired pressure of the film against the film gate, and this adequate pressure, even after some permanent elongation of the bands, will be maintained for a considerable period of time, corresponding to the particular characteristics and the prestressing of the spring 43. In the event that the time comes when the tension on the bands is not sufficient, then the knob 50 is turned by the operator so as to increase the tension. Thus, the bands of the invention can be used for a long time.

It is also of significance that the bands of the invention are very flexible and have very little inherent resilience so that they conform without resistance to the curvature of the guide surface 53. This is true even when the guide surface is of a relatively sharp curvature along a relatively small radius. It cannot happen with the bands of the invention that some part of these bands, due to their inherent resiliency, lifts away from the guide surface along an intermediate portion of the latter, as can easily happen with steel bands.

It will be understood that each of the elements described above, or two or more together, may also find a useful application in other types of motion picture apparatus differing from the types described above.

While the invention has been illustrated and described as embodied in film guiding structure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a motion picture projector, in combination, an arcuate guide surface along which film to be projected is adapted to move; a pair of flexible plastic bands engaging the film at side edge portions thereof and holding the latter against said surface, said plastic bands being of a material which has a low coefficient of friction with respect to the film so that the latter slides easily with respect to the plastic bands; a support carrying said bands, said support having a front end along which said bands extend and a pair of opposed faces, said bands being fixed to one of said faces and said support pivotally carrying at the other of its faces a pair of levers to which said bands also are respectively connected, said levers being turnable toward and away from said other face of said support; a transverse member extending transversely between and connected to said levers; and spring means acting on said transverse member to urge the latter away from said other face of said support, said transverse member evenly distributing the forces of said spring means to said levers so that said bands are equally tensioned.

2. In a motion picture projector, in combination, an arcuate guide surface along which film to be projected is adapted to move; a pair of flexible plastic bands engaging the film at side edge portions thereof and holding the latter against said surface, said plastic bands being made of a substantially non-elastic resin which has a low coefficient of friction with respect to the film so that the latter slides easily with respect to plastic bands; a support carrying said bands, said support having a front end along which said bands extend and a pair of opposed faces, said bands being fixed to one of said faces; a pair of levers pivotally connected to said support at the other of said faces thereof, each lever being pivotally connected at one of its ends to said support and having a free end distant from said pivotally connected end, said levers having a common turning axis with respect to said support and being turnable together about said axis toward and away from said other face of said support, said bands extending around said free ends of said levers and being respectively fixed thereto so that when said levers turn away from said other face of said support said bands are tensioned; a transverse member extending transversely between and having opposed ends respectively pivotally connected with said levers, said transverse member being connected to each lever intermediate the ends thereof; and spring means acting on said transverse member to urge the latter and said levers therewith away from said other face of said support, said transverse member evenly distributing the forces of said spring means to said levers so that said bands are equally tensioned.

References Cited in the file of this patent
UNITED STATES PATENTS

| | | |
|---|---|---|
| 1,943,366 | Brown | Jan. 16, 1934 |
| 2,617,327 | D'Arcy | Nov. 11, 1952 |
| 2,839,978 | Trump | June 24, 1958 |

FOREIGN PATENTS

| | | |
|---|---|---|
| 680,353 | Great Britain | Oct. 1, 1952 |